J. J. TOBIN.
COASTER BRAKE.
APPLICATION FILED NOV. 3, 1915.
1,224,514.
Patented May 1, 1917.
2 SHEETS—SHEET 1.
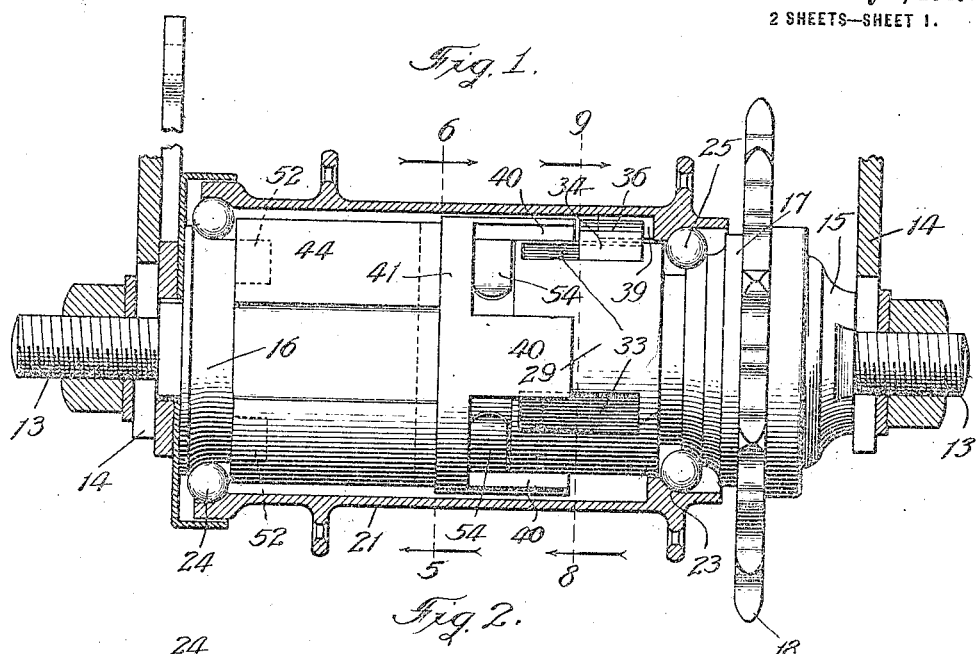
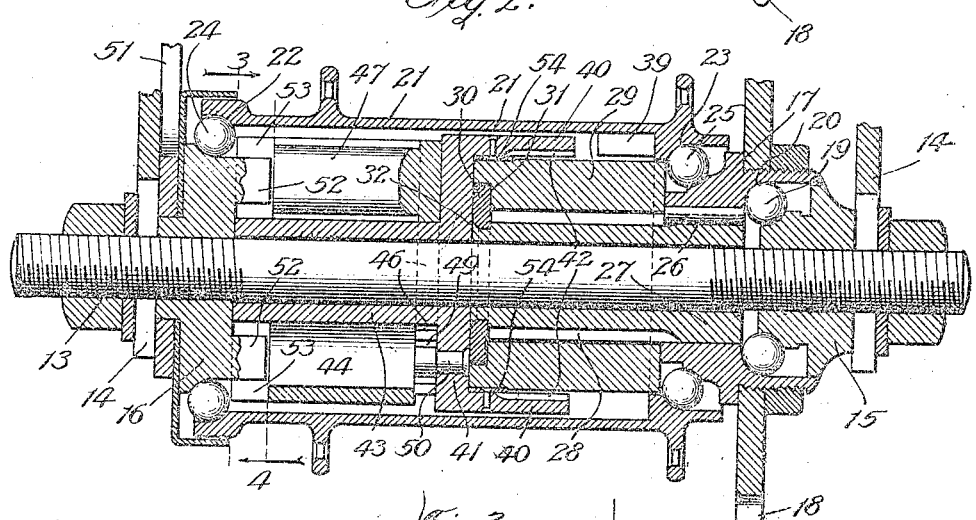
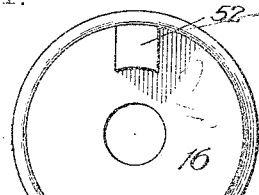
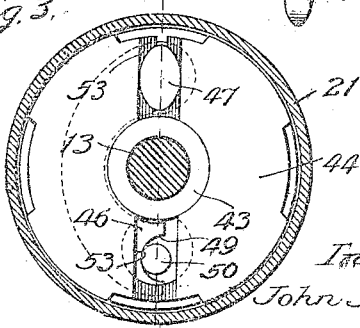
Witnesses:
Inventor:
John J. Tobin,
By Dyrenforth, Lee, Chritton & Wiles
Attys.

J. J. TOBIN.
COASTER BRAKE.
APPLICATION FILED NOV. 3, 1915.

1,224,514.

Patented May 1, 1917.
2 SHEETS—SHEET 2.

Witnesses:
Irwin C. Bowman
Chas. H. Bull

Inventor:
John J. Tobin,
By Dyrenforth, Lee, Chritton and Wiles
Attys.

UNITED STATES PATENT OFFICE.

JOHN J. TOBIN, OF CHICAGO, ILLINOIS, ASSIGNOR TO TOBIN MANUFACTURING COMPANY, OF CHICAGO, ILLINOIS, A CORPORATION OF ILLINOIS.

COASTER-BRAKE.

1,224,514.

Specification of Letters Patent. Patented May 1, 1917.

Application filed November 3, 1915. Serial No. 59,403.

*To all whom it may concern:*

Be it known that I, JOHN J. TOBIN, a citizen of the United States, residing at Chicago, in the county of Cook and State of Illinois, have invented a new and useful Improvement in Coaster-Brakes, of which the following is a specification.

My invention relates to improvements in coaster-brakes provided, more particularly, for bicycles or vehicles of a similar nature, and involving a driven element, as for example a sprocket, coöperating with other elements for transmitting power to a wheel of the vehicle when said sprocket is rotated in one direction, for exerting a braking force on the wheel when the sprocket is rotated in the opposite direction, and for permitting the wheel to coast when the sprocket is moved to a neutral position; and my objects, generally stated, are to provide improvements in coaster-brakes to the end that they will be better adapted to perform their functions.

Referring to the accompanying drawings—

Figure 5:
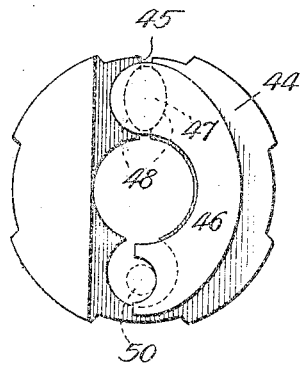
Figure 6:
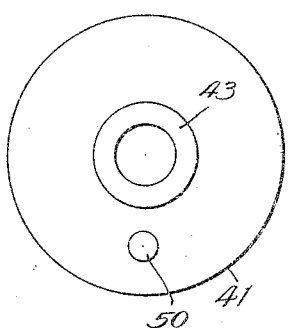
Figure 7:
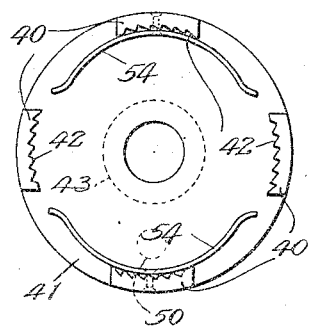
Figures 8, 9, 13, 14:
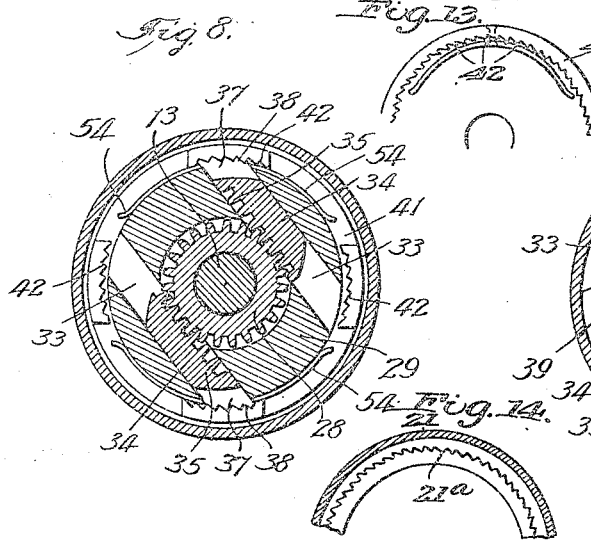
Figure 10:
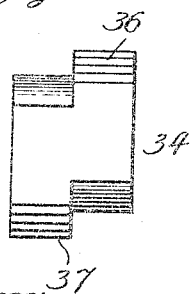
Figure 11:
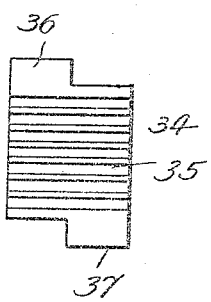
Figure 12:
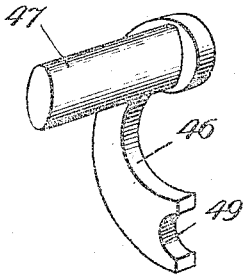

Figure 1 is a longitudinal view in elevation of a coaster-brake constructed in accordance with my invention, and shown as applied to operative position in a bicycle-frame, the hub of the wheel, the frame and certain other parts being shown in section. Fig. 2 is a longitudinal sectional view of the device. Fig. 3 is a section taken at the line 3 on Fig. 2 and viewed in the direction of the arrow with the adjacent end-bearing omitted. Fig. 4 is a view in end elevation of one of the bearing members, this view being taken at the line 4 on Fig. 2 and viewed in the direction of the arrow. Figs. 5 and 6 are views in end elevation of a portion of the braking mechanism and a cage employed, these views being taken as indicated at the lines 5 and 6, respectively, on Fig. 1 and viewed in the direction of the respective arrows. Fig. 7 is a face view of a clutch-member employed. Figs. 8 and 9 are sections taken at the lines 8 and 9, respectively, on Fig. 1, and viewed in the direction of the respective arrows. Figs. 10 and 11 are views of opposite sides of one of a pair of other clutch-members employed. Fig. 12 is a perspective view of the member through the medium of which the expansible braking member of the device is operated. Fig. 13 is a fragmentary view like Fig. 7 of a modification of the member shown therein; and Fig. 14, a similar view of a modification of the revolving hub of the wheel.

In the arrangement illustrated a shaft 13 on which the several parts of the coaster-brake are supported, is shown as rigidly supported at its ends in the bifurcated portions 14 of a bicycle-frame. The shaft 13 has screwed thereon at its opposite ends, the members 15 and 16, the member 15 affording a ball-race and the member 16 being a combined ball-race and clutch-member.

Surrounding the shaft 13 and free to revolve thereon, is a driving-element 17 which, in the particular arrangement illustrated, is equipped with a sprocket 18 which represents the usual rear-wheel sprocket of a bicycle. The element 17 has journal-support on the member 15 through the medium of balls 19 confined between a race 20 on the element 17 and the race on the member 15. The hub of the wheel represented at 21 is provided at its opposite ends with ball-races 22 and 23, between which and the races on the members 16 and 17, respectively, balls 24 and 25, are confined, whereby the hub 21 is supported on ball-bearings.

The member 17 surrounds, and is secured, as by the pin 26, to a sleeve-member 27 which surrounds the shaft 13 and projects beyond the member 17, at which portion it is in the form of a pinion represented at 28. Surrounding the pinion 28 is a cylindrical cage 29 which is secured in position between the member 17 and a washer 30 surrounding and secured to, the outer reduced end of the member 27, the washer 30, which fits in an annular recess 31 in the face of the cage 29, being held to the member 27 as by upsetting the end of the latter, as shown at 32. The cage 29 contains parallel slots 33 extending entirely therethrough, these slots being disposed in planes parallel with the axle of the pinion 28 and equidistantly spaced therefrom. The cage 29 houses a pair of clutch-members 34 which are confined in the slots 33 to slide back and forth therein. Each member 34 is of less length than the slot 33 it occupies, and is provided on its inner face with a rack 35 which meshes at all times with the pinion 28. Each of the members 34 is formed at its opposite ends with projections 36 and 37, preferably serrated, as represented at 38, these projections being arranged at opposite sides of the median lines of the members 34, as clearly shown in Figs. 10 and 11. The projections 36 are adapted to interlock with shouldered lugs 39 secured to, and equidistantly spaced about, the inner periphery of the hub 21 for driving the latter as hereinafter described, and the projections 37 coöperate with arms 40 carried by a disk 41 and arranged in an annular series about the periphery of said disk and extending lengthwise of the axle 13, the outer ends of these arms which are preferably serrated, as indicated at 42, extending into the path of the projections 37 for engagement therewith when the latter are projected beyond the periphery of the cage 29, for producing braking action, as hereinafter described.

The disk 41 which surrounds the shaft 13 and is rotatable thereon, has a sleeve-extension 43 which passes through, and forms a support for, an expansible braking element 44 formed of springy material, which is split as indicated at 45 and is adapted to be expanded into frictional engagement with the inner surface of the hub 21 for braking the latter. Interposed between the braking element 44 and the disk 41, is a lever 46 which has at one end a laterally-extending section 47, preferably of elliptical shape in cross-section, which extends into, and loosely fits, a similarly-shaped recess 48 provided between the opposing surfaces of the element 44 at its split portion 45. The opposite end of the lever 46 is recessed as indicated at 49 at which it registers with a pin 50 extending laterally from the disk 41. In the operation of the device, as hereinafter more fully described, for braking the wheel, the lever 46 is rocked on its extension 47 as a pivot, thus expanding the element 44 against the hub 21, and to hold the element 44 rigidly against rotation, the member 16, which is preferably interlocked with an arm 51 which in practice would be attached to the frame of the bicycle, to hold the member 16 against rotation, is provided with laterally-extending lugs 52 which enter, and interlock with, correspondingly-shaped recesses 53 in the opposing end of the element 44.

The operation of the device is as follows:
When the sprocket-wheel 18 is not being driven and the parts of the device are in normal position, the projections 36 and 37 do not project beyond the periphery of the cage 29, and the element 44 is out of braking contact with the inner surface of the hub 21. When the sprocket-wheel 18 is driven in a clock-wise direction, then the member 17 with its pinion-extension 28 is driven in the direction of the arrow in Fig. 9, and by reason of the engagement of the pinion 28 with the racks 35, the members 34 are actuated in the cage 29 in opposite directions to project them at their sections 36 beyond the periphery of the cage 29 and into engagement with the shoulders of the lugs 39 on the hub 21, as represented in Fig. 9, to drive the wheel forwardly, certain of the arms 40, by preference, being provided with springs 54 which exert sufficient pressure against the cage 29 to overcome the resistance offered by the members 34 to movement to said position, and therefore insure the interlocking of the projections 36 with the lugs 39.

When it is desired to brake the wheel, the operator by slightly back-pedaling rotates the sprocket-wheel 18, relative to the revolving hub 21, in a counter clockwise direction, to a degree sufficient to move the members 34 in the direction opposite to that first described, to a position in which the projections 37 protrude beyond the cage 29 and engage at their edges with opposing edges of the arms 40 and interlock therewith, or mesh at their serrations 38 with the serrations 42 on these arms. The force of back-pedaling is thus communicated to the disk 41 rotating the latter counter clockwise, the pin 50 in this movement rocking the lever 46 on its extension 47, with the result of expanding the element 44 into braking engagement with the hub 21, the braking force thus exerted being proportional to the back-pressure exerted on the sprocket-wheel 18.

The coaster-position of the device, namely that in which the sprocket 18 is not in driving connection with the hub 21 and the brake is released, is effected by the operator shifting the sprocket 18 to a position in which the projections 36 and 37 are withdrawn into the cage 29, as will be readily understood.

As an obvious modification of the structure, and following out the suggestion contained in the drawings, the surface opposing the projections 37 instead of being interrupted by the provision of the arms 40 as described, may be continuous as represented in Fig. 13, and the desired interlock of the projections 37 for producing the braking action may be effected wholly by the engagement of the outer surfaces of these projections, preferably at serrations as those indicated at 38, with the serrations 42 on such continuous surface, or by any desirable friction means, and the same character of engagement may be provided between the projections 36 and the hub 21, which latter to this end would have the annular series of teeth 21ᵃ, as represented in part in Fig. 14, instead of the interlocks effected between these projections and the shouldered surfaces of the lugs 39, as described.

It is of course obvious that in place of the wheel hub any other element acting in a similar way and fixedly secured to the wheel would be the equivalent in its uses to the use of the hub of the wheel as part of my structure herein, and in the claims in using the words wheel hub it is to be construed of course as including such equivalent structure.

While I have illustrated and described a particular construction embodying my invention and suggested certain modifications thereof, other modifications and alterations may be made without departing from the spirit of my invention.

What I claim as new and desire to secure by Letters Patent is—

1. In a device of the character described, the combination with a wheel-hub, of a driving element, a cage, and means mounted in said cage shiftable transversely of said hub adapted to occupy alternative positions depending upon the direction of force exerted by said driving element and including a section provided with a rack, said means being interposed between said element and said hub, to alternately drive or brake said hub and said element including a pinion meshing with said rack.

2. In a device of the character described, the combination with a wheel-hub, of a driving element, a cage, and means mounted in said cage shiftable transversely of said hub adapted to occupy alternative positions depending upon the direction of force exerted by said driving element and including sections each provided with a rack, said means being interposed between said element and said hub to alternately drive or brake said hub, said element including a pinion and said sections meshing at their racks with said pinion.

3. In a device of the character described, the combination with a wheel-hub, of a driving element, a cage, shifting means guidingly confined in said cage and interposed between said element and said hub and adapted to occupy alternative positions depending upon the direction of force exerted by said driving element and including a section provided with a rack, said element including a pinion intermeshing with said rack, and means stationarily mounted relative to said first-named means and adapted to coöperate with said first-named means when in one of its alternative positions.

4. In a device of the character described, the combination with a wheel-hub, of a driving element, shifting means interposed between said element and said hub, said means being guidingly mounted to be movable in a straight line transversely of the device and affording portions adapted to occupy alternative positions depending upon the direction of force exerted by said driving element, said portions being disposed in different positions along the axis of said device, one of said portions being adapted to drive said hub, and a braking mechanism for said hub, positioned for coöperation with the other portion of said shifting means for actuation thereby when the latter is in one of its alternative positions.

5. In a device of the character described, the combination with a wheel-hub, of a driving element, shifting means interposed between said element and said hub, said means being movable transversely of the device and affording portions adapted to occupy alternative positions depending upon the direction of force exerted by said driving element, said portions being disposed in different positions along the axis of said device, one of said portions being adapted to drive said hub, a cage in which said shifting means are guidingly confined to have straight line movement, and a braking mechanism for said hub positioned for coöperation with the other portion of said shifting means for actuation thereby when the latter is in one of its alternative positions.

6. In a device of the character described, the combination with a wheel-hub, of a driving element, shifting means interposed between said element and said hub, said means including a plurality of members located at opposite sides of the axis of the device and movable transversely of the device, and each affording portions adapted to occupy alternative positions depending upon the direction of force exerted by said driving element, and means operated by said driving element for actuating said members, said portions being disposed in different positions along the axis of said device, one of the portions on each of said members being adapted to drive said hub, and a braking mechanism for said hub positioned for coöperation with the other portions of said members for actuation thereby when the latter are in one of their alternative positions.

7. In a device of the character described, the combination with a wheel-hub, of a driving element, shifting means interposed between said element and said hub, said means including a plurality of members located at opposite sides of the axis of the device and guidingly mounted to be movable in a straight line transversely of the device and each affording portions adapted to occupy alternative positions depending upon the direction of force exerted by said driving element, said portions being disposed in different positions along the axis of said device, one of the portions on each of said members being adapted to drive said hub, and a braking mechanism for said hub, positioned for coöperation with the other portions of said members, for actuation thereby when the latter are in one of their alternative positions.

8. In a device of the character described, the combination with a wheel-hub, of a driving element, shifting means interposed between said element and said hub, said means including a plurality of members located at opposite sides of the axis of the device and movable transversely thereof, and affording portions adapted to occupy alternative positions, depending upon the direction of force exerted by said driving element, said portions being disposed in different positions along the axis of said device, one of the portions on each of said members being adapted to drive said hub, a cage in which said plurality of members are guidingly confined to have straight line movement, and a braking mechanism for said hub positioned for coöperation with the other portions of said members for actuation thereby when the latter are in one of their alternative positions.

9. In a device of the character described, the combination with a wheel-hub, of a driving element, a shiftable member interposed between said element and hub movable transversely of the device and affording portions adapted to occupy alternative positions depending upon the direction of force exerted by said driving element, said portions being disposed in different positions along the axis of said device, one of said portions being adapted to drive said hub, said member being formed with a rack, and said driving element having a pinion intermeshing with said rack, and a braking mechanism for said hub positioned for coöperation with the other portion of said shiftable member for actuation thereby when the latter is in one of its alternative positions.

10. In a device of the character described, the combination with a wheel-hub, of a driving element, members interposed between said element and hub and movable transversely of the device and each affording portions adapted to occupy alternative positions depending upon the direction of force exerted by the said driving element, said portions being disposed in different positions along the axis of said device, one of said portions on each member being adapted to drive said hub, said members being provided with racks, and said driving element having a pinion intermeshing with said racks, and a braking mechanism for said hub positioned for coöperation with the other portions of said shiftable members for actuation thereby when the latter are in one of their alternative positions.

11. In a device of the character described, the combination with a wheel-hub, of a driving element, a cage, means for yieldingly restraining the rotation of said cage, and means for alternately driving and braking said hub, including a shiftable element through the medium of which the hub is alternately driven and braked, guidingly confined in said cage and adapted to occupy alternative positions depending upon the direction of force exerted by said driving element.

12. In a device of the character described, the combination with a wheel-hub, of a driving element, a shiftable member interposed between said hub and said driving element, a cage in which said shiftable element is guidingly confined, said shiftable element being adapted to occupy alternative positions depending upon the direction of force exerted by said driving element and operating when in one of its positions to drive said hub, a brake for said hub, means for operating said brake adapted to be actuated by said shiftable element when in the other of its alternative positions, and means carried by said last named means for yieldingly restraining rotation of said cage.

13. In a device of the character described, the combination of an axle, a wheel-hub surrounding said axle and rotatable thereon, a driving element rotatable on said axle, a cage surrounding said axle, shiftable members located at opposite sides of said axle and guidingly confined in said cage to be movable transversely of said axle, each of said members being provided at opposite ends with portions disposed in different positions along the axis of said device, a pinion operatively connected with said driving element and interposed between said members, racks on said members engaging said pinion, one portion of each of said members being adapted to engage with, and drive, said hub, when said driving element is rotated in one direction, a braking device, a flanged member surrounding said axle and having movement relative to said axle, means interposed between said last-named member and said braking device, operating when said last-named member is moved to actuate said braking device, the other portions of said movable member being adapted to engage with, and actuate, said last-named member when said driving element is rotated in the opposite direction.

JOHN J. TOBIN.

In presence of—
D. C. THORSEN,
A. C. FISCHER.